(12) United States Patent
Ringlien et al.

(10) Patent No.: US 6,806,459 B1
(45) Date of Patent: Oct. 19, 2004

(54) MEASUREMENT OF TRANSPARENT CONTAINER SIDEWALL THICKNESS

(75) Inventors: James A. Ringlien, Maumee, OH (US); John W. Juvinall, Ottawa Lake, MI (US)

(73) Assignee: Owens-Brockway Glass Container Inc., Toledo, OH (US)

(*) Notice: Subject to any disclaimer, the term of this patent is extended or adjusted under 35 U.S.C. 154(b) by 319 days.

(21) Appl. No.: 09/942,897

(22) Filed: Aug. 30, 2001

(51) Int. Cl.[7] .......................... B07C 5/10; G01N 21/00
(52) U.S. Cl. ........................ 250/223 B; 250/559.28; 209/524; 356/239.4
(58) Field of Search ...................... 250/223 B, 223 R, 250/559.27, 559.28, 221, 222.1; 209/522, 524, 526, 529; 356/239.1, 239.2, 239.4, 239.7

(56) References Cited

U.S. PATENT DOCUMENTS

| | | |
|---|---|---|
| 3,356,853 A | 12/1967 | Rottmann |
| 4,822,171 A | 4/1989 | Brand et al. |
| 4,859,861 A | 8/1989 | Mersch |
| 4,874,940 A | 10/1989 | McMeekin et al. |
| 4,912,318 A | 3/1990 | Kajiura et al. |
| 4,967,070 A | 10/1990 | Ringlien et al. |
| 5,008,533 A | 4/1991 | Lee, Jr. |
| 5,136,157 A | 8/1992 | Apter et al. |
| 5,175,428 A | 12/1992 | Agerskov et al. |
| 5,291,271 A | 3/1994 | Juvinall et al. |
| 5,301,238 A | 4/1994 | Apter et al. |
| 5,405,015 A | 4/1995 | Bhatia et al. |
| 6,172,355 B1 | 1/2001 | Gast et al. |
| 6,256,095 B1 * | 7/2001 | Ringlien ................ 356/239.4 |

FOREIGN PATENT DOCUMENTS

| | | | |
|---|---|---|---|
| DE | 3611536 | 10/1987 | |
| DE | 19837551 | 3/2000 | |
| EP | 0320139 A2 * | 6/1989 | ........ G01B/11/06 |

* cited by examiner

Primary Examiner—Kevin Pyo (57) ABSTRACT

Apparatus for measuring sidewall thickness of a container includes a conveyor for moving the container transversely of its axis through an inspection station and simultaneously rotating the container about its axis. A light source and an illumination lens system direct onto the sidewall of the container a line-shaped light beam having a long dimension perpendicular to the axis of the container and parallel to the direction of movement of the container through the inspection station. A light sensor and an imaging lens system direct onto the sensor light energy reflected from portions of the outer and inner sidewall surfaces that are perpendicular to the illumination light energy. An information processor is responsive to light energy directed onto the light sensor by the imaging lens system for determining the thickness of the container between the outer and inner sidewall surfaces.

19 Claims, 7 Drawing Sheets

MEASUREMENT OF TRANSPARENT CONTAINER SIDEWALL THICKNESS

The present invention is directed to inspection of transparent containers for commercial variations that affect optical properties of the containers, and more particularly to an apparatus and method for electro-optically measuring thickness of container walls (sidewalls, shoulder, neck, heel and/or bottom).

BACKGROUND AND OBJECTS OF THE INVENTION

In the manufacture of transparent containers of glass composition, for example, it has heretofore been proposed to measure the sidewall thickness of the containers in order to detect thin areas that may affect the ability of the containers to withstand pressurization and handling. In one container sidewall thickness gauge commercially employed by applicants' assignee, a radio frequency electrode is placed near the outer surface of the container wall, and the amplitude of the signal received at a coaxial pick-up electrode is related to container wall thickness. This technique is highly sensitive to the distance between the pick-up electrode and the container wall surface, and the electrode is mounted on a wheel that rides on the container surface in order to control the electrode/surface separation. Mechanical contact with the container and vibration at the probe when the container moves into position cause a high failure rate at the electrode assembly.

U.S. Pat. No. 5,291,271, assigned to the assignee of the present application, discloses an apparatus and method for electro-optically measuring the thickness of a container wall. A light source directs a light beam onto the outer surface of the container at an angle such that a portion of the light beam is reflected from the outer surface, and a portion is refracted into the container wall, reflected from the inner wall surface and then re-emerges from the outer wall surface. A lens system is disposed between a light sensor and the container wall for focusing light energy reflected from the outer and inner wall surfaces onto the sensor. The lens system has an image plane in which the sensor is disposed and an object plane colinear with the light beam. The container is rotated about its central axis, and information processing electronics are responsive to the light energy incident on the sensor for scanning the sensor at increments of container rotation and determining wall thickness of the container between the inner and outer wall surfaces as a function of the separation between the points of incidence of the reflected light energies on the sensor.

It is a general object of the present invention to provide a method and apparatus of the type disclosed in the above-noted patent for measuring wall thickness of transparent containers, which have reduced sensitivity to container position, and which in the preferred embodiments of the invention are adapted to measure wall thickness of containers traveling transversely through an inspection station.

SUMMARY OF THE INVENTION

A method of measuring wall thickness of a transparent cylindrical container in accordance with the presently preferred embodiments of the invention includes moving the container transversely through a defined path while simultaneously rotating the container about its axis. A line-shaped light beam is directed onto the wall of the container, with the line-shaped light beam having a long dimension perpendicular to the axis of the container and parallel to the direction of translation of the container. Light energy is directed onto a sensor as reflected from portions of the outer and inner wall surfaces of the container that are perpendicular to the light energy directed onto the container, as viewed from a direction parallel to the container axis, and container wall thickness is measured as a function of separation at the sensor between the light reflected from the outer and inner wall surfaces.

A method of measuring wall thickness of transparent cylindrical containers in accordance with another aspect of the preferred embodiments of the invention includes moving the containers transversely along a defined path and simultaneously rotating the containers about their central axes. Light energy is directed onto each container at an angle to the axis of the container such that a portion of the light energy is reflected from the outer surface of the container wall, and a portion is refracted into the container wall and reflected from the inner wall surface. The portions of the light energy reflected from the outer and inner wall surfaces along a light path co-planer with the incident light energy and with the container axis are directed onto a light sensor. Wall thickness of each container is measured as a function of the separation at the sensor between the light portions reflected from the inner and outer wall surfaces of the container. The sensor is preferably scanned at increments of container translation along the path, and wall thickness is measured at angularly spaced positions around the container corresponding to the increments of container translation along the path. In one embodiment of the invention, the light energy is directed continuously onto each container as the container moves along the path. In another embodiment of the invention, a number of containers are moved and simultaneously rotated along the path, and the light energy is directed onto each of the containers in sequence as the containers are moved and rotated along the path.

Apparatus for measuring sidewall thickness of a container in accordance with the preferred embodiments of the invention includes a conveyor for moving the container transversely of its axis through an inspection station and simultaneously rotating the container about its axis. A light source and an illumination lens system direct onto the sidewall of the container a line-shaped light beam having a long dimension perpendicular to the axis of the container and parallel to the direction of movement of the container through the inspection station. A light sensor and an imaging lens system direct onto the sensor light energy reflected from portions of the outer and inner sidewall surfaces that are perpendicular to the illumination energy as viewed from a direction parallel to the container axis. An information processor is responsive to light energy directed onto the light sensor by the imaging lens system for determining the thickness of the container between the outer and inner sidewall surfaces.

In one embodiment of the invention, the illumination lens system directs the light energy continuously onto each container as it moves through the inspection station. In another embodiment of the invention, the conveyor is constructed to move multiple containers through the inspection station simultaneously and in sequence, and the illumination lens system includes a mirror and an actuator coupled to the mirror to direct the illumination beam onto each container in sequence as the containers move through the inspection station. The information processor is coupled to the actuator for selectively controlling the direction of light energy onto the containers. An encoder is coupled to the conveyor in the preferred embodiments of the invention, and the information processor is coupled to the encoder for scanning the sensor at increments of container motion through the inspection station. The conveyor in the preferred embodiments of the invention comprises a rail and a belt for rolling the container along the rail. The light source is disposed to direct the light energy onto an external surface of the container adjacent to the rail.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
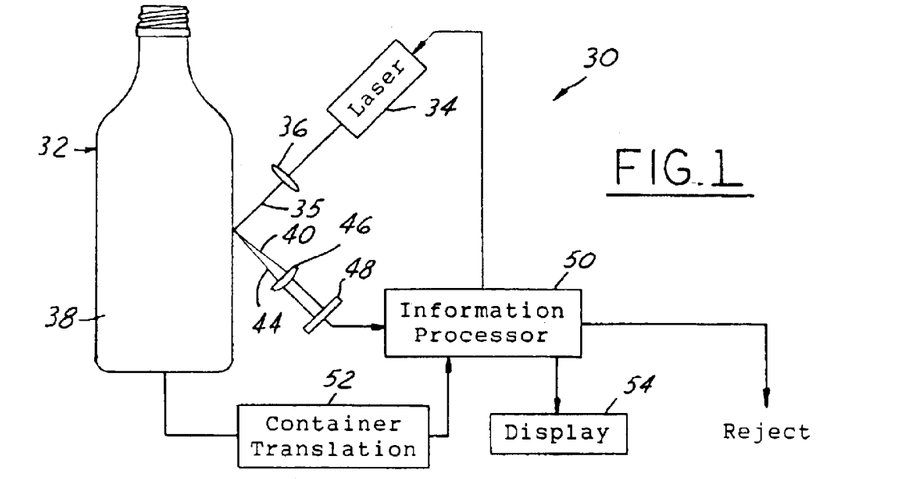
FIG. 1 is a schematic diagram of a container sidewall thickness measurement apparatus in accordance with one presently preferred embodiment of the invention.
Figure 5:
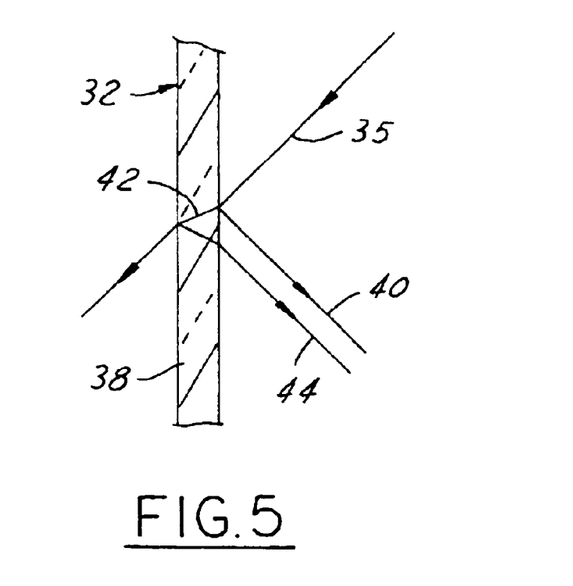
FIG. 5 is a schematic illustration of the reflection and refraction of light energy at the container sidewall.

FIG. 1 is a schematic diagram of an apparatus 30 for measuring the sidewall thickness of a container 32 in accordance with one presently preferred embodiment of the invention. A laser 34 directs a collimated light beam 35 through an illumination lens system 36 onto the sidewall 38 of container 32. As illustrated in FIG. 5, a portion 40 of illumination beam 35 is reflected from the external surface of container sidewall 38, while a portion 42 is refracted into the container sidewall. Of this portion 42, a portion 44 is reflected from the internal sidewall surface and emerges from the external surface at a position spaced from reflected portion 40. These light beams 40, 44 are directed by an imaging lens system 46 (FIG. 1) onto a sensor 48, at which the separation between the reflected light beams 40, 44 is indicative of the thickness of container sidewall 38. An information processor 50 is connected to sensor 48 for scanning the sensor. An encoder 52 is responsive to translation of the container through the inspection station for providing to information processor 50 signals indicative of translation and rotation of the container. Information processor 50 determines the container sidewall thickness, and is adapted to display such thickness at a display 54 and/or to initiate rejection of the container if the sidewall thickness measurement is not satisfactory and/or to supply thickness information to container molding equipment for feedback control purposes.

Figure 4:
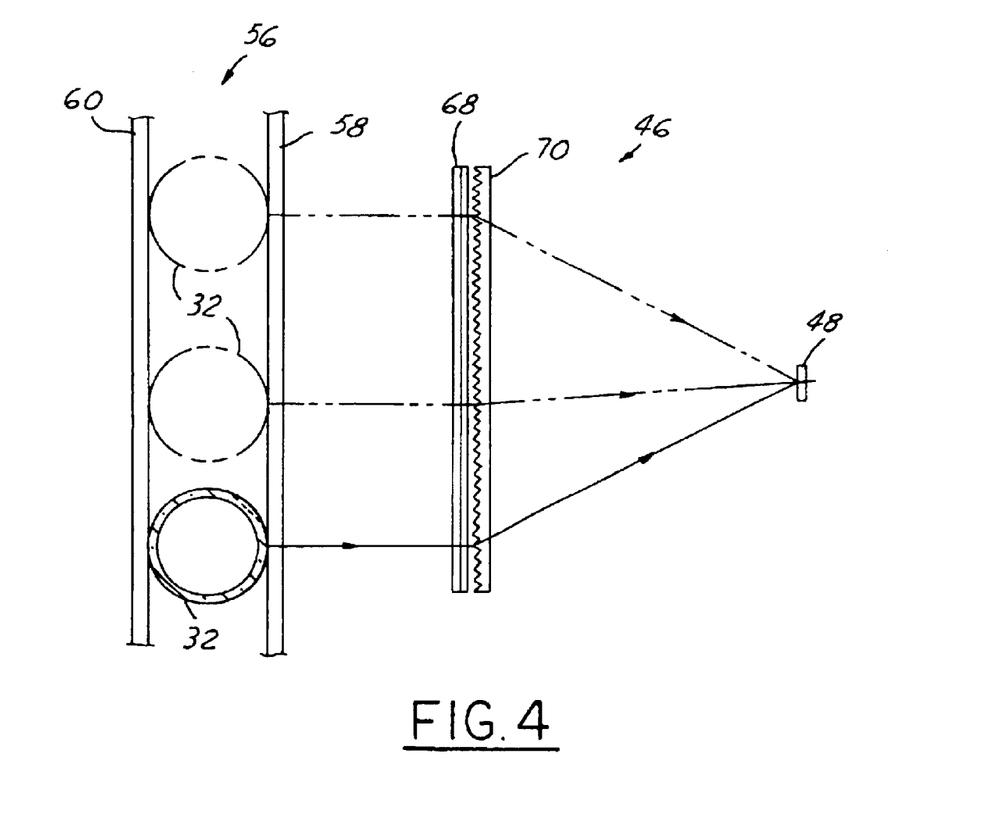
FIG. 4 is a top plan view of the imaging lens system in the embodiment of FIG. 2, being taken in the direction 4 in FIG. 2.

Container 32 is translated and rotated through the inspection station by a conveyor 56 (FIG. 4). Conveyor 56 includes one or more linear rails 58 for engaging and supporting the container sidewall, and a linear driven belt 60 for "rolling" the containers along the opposing rails. The containers preferably are translated horizontally and rotated about their vertical axes. Conveyors of this type for simultaneously translating and rotating containers through an electro-optical inspection station are illustrated, for example, in U.S. Pat. Nos. 4,874,940 and 6,172,355, the disclosures of which are incorporated herein by reference for purposes of background.

Figure 2:
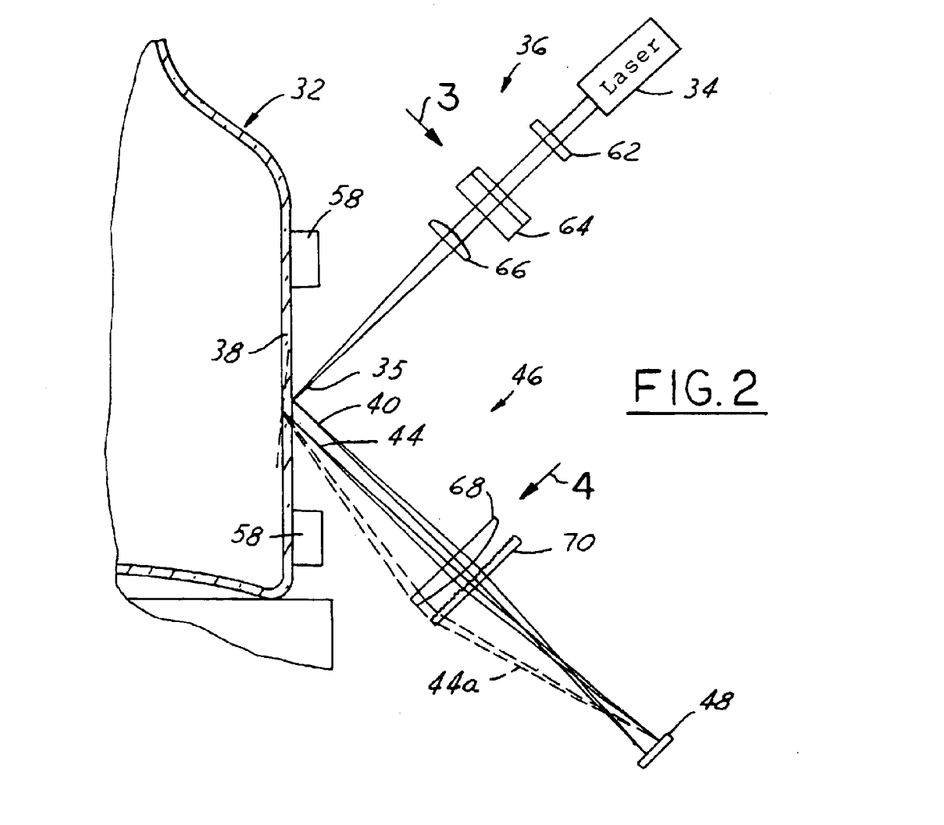
FIG. 2 is a schematic diagram of a portion of the apparatus illustrated in FIG. 1 illustrating the illumination and imaging lens systems in greater detail.
Figure 3:
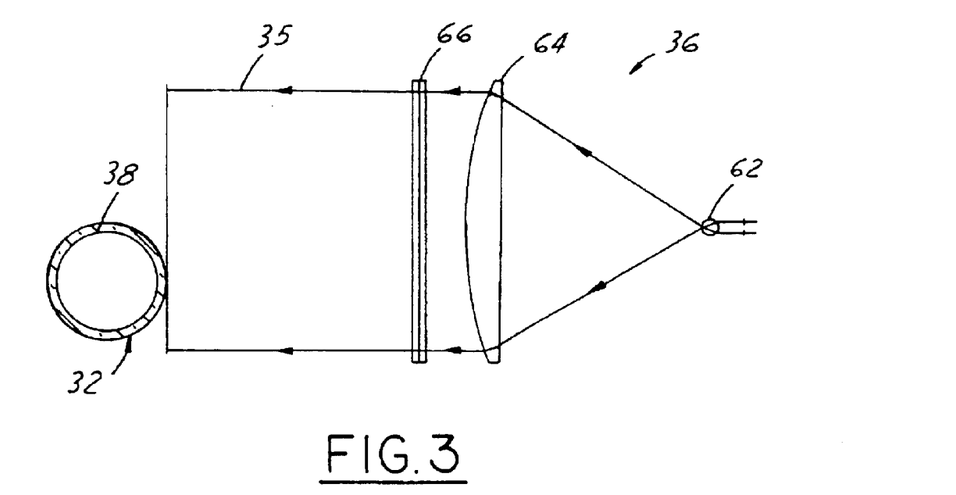
FIG. 3 is a top plan view of the illumination lens system of FIG. 2, being taken in the direction 3 in FIG. 2.

FIGS. 2 and 3 illustrate illumination lens system 36 in greater detail. The output of laser 34 is directed through a cylinder lens 62, which could be a glass rod for example, which spreads or fans the light in the plane of FIG. 3. A second cylinder lens 64 has its focal point at the divergence point of lens 62. The result is that the light beam leaves lens 64 as a wide swath with its rays parallel and at approximately the thickness of the laser output. A third cylinder lens 66 has its focal point at the plane of the inner surfaces of rails 58, and thus at the outer surface of container 32 in engagement with the rails. Cylinder lens 66 thus focuses onto the outer surface of the container a thin line-shaped light beam 35 that has along dimension perpendicular to the axis of the container and parallel to the direction of translation of the container through the inspection station, as best seen in FIG. 3.

Figure 6:
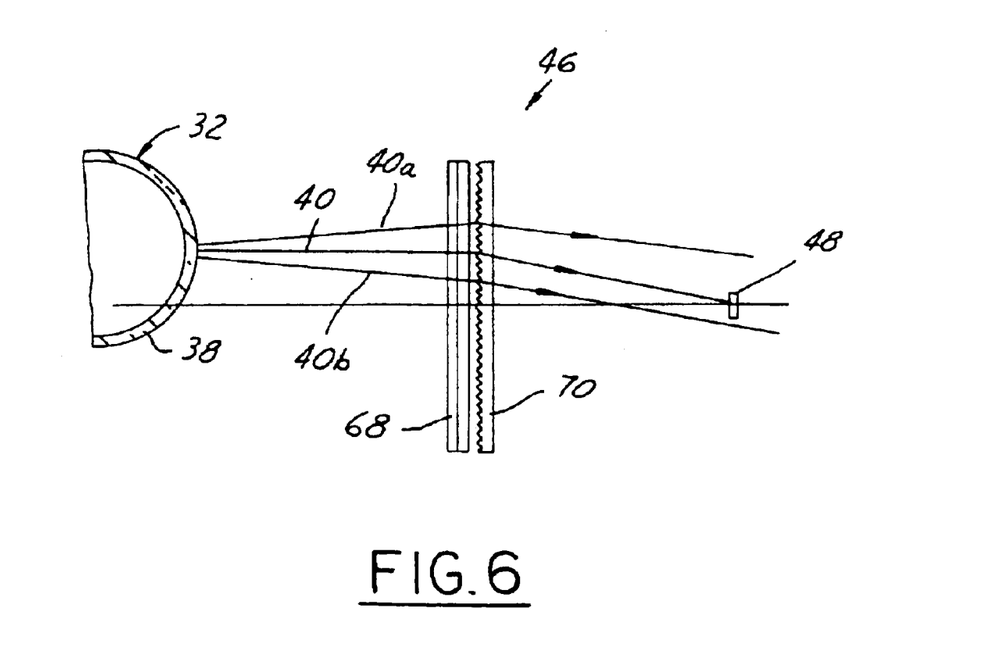
FIG. 6 is a fragmentary schematic diagram of the imaging system of FIG. 4 showing rejection of reflected light energy that is not coplanar with the illumination light energy.

Referring now to FIGS. 2 and 4, imaging lens system 46 includes a cylinder lens 68 and a fresnel lens 70. The combination of cylinder lens 68 and fresnel lens 70 has an image plane in which sensor 48 is disposed and an object plane colinear with the long dimension of line-shaped illumination light beam 35 at the outer sidewall surface of the container. Thus, imaging lens system 46 focuses reflected light beams 40, 44 (FIG. 5) onto sensor 48, with the separation between the light beams at the sensor being indicative of the container sidewall thickness. In the event that the inside surface of container sidewall 38 is tilted, reflected light beam 44 takes the path illustrated at 44a in FIG. 2, but yields the same wall thickness indication at sensor 48. As illustrated in FIG. 6, imaging lens system 46 ensures that only the reflected light rays 40 (or 44) that are reflected from points perpendicular to the illumination rays, as viewed from a direction parallel to the container axis, are directed onto sensor 48. That is, only light rays that are incident on and reflected from the surfaces of the container in a plane that includes the container axis are directed onto the sensor. Light rays 40a and 40b for example, which are reflected from points non-perpendicular to the illumination light energy, are divergent and directed by lens system 46 away from light sensor 48. Light sensor 48 preferably comprises a lineal array of light sensor elements, with the array being in the plane of FIG. 2 and perpendicular to the plane of FIG. 4. Alternatively, sensor 48 may comprise an area array sensor in which only a portion is used for wall thickness measurement in accordance with the present invention.

Figure 7:
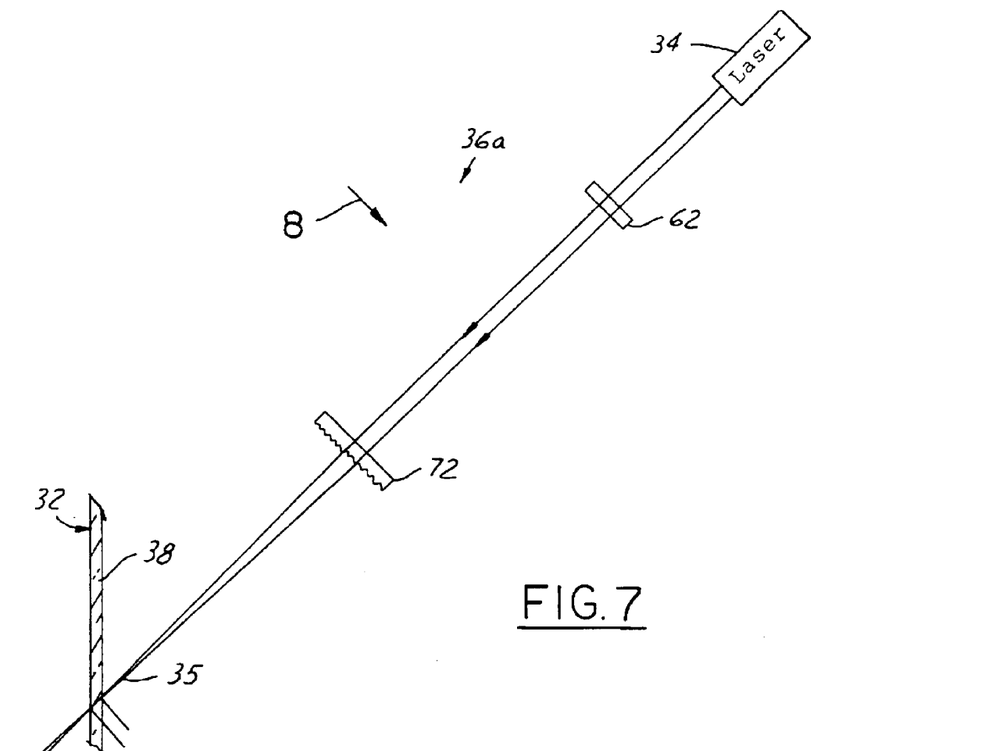
FIG. 7 is a schematic diagram that is similar to a portion of FIG. 2 but illustrates a modified illumination system in accordance with the present invention.
Figure 8:
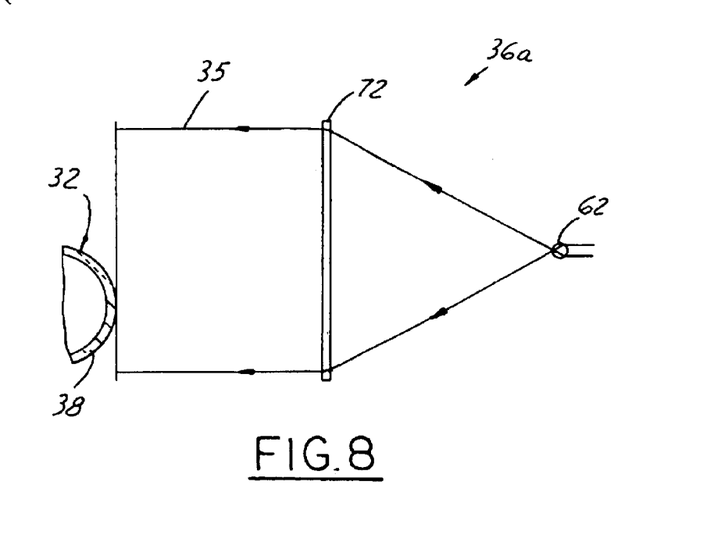
FIG. 8 is a top plan view of the illumination system of FIG. 7, being taken in the direction 8 in FIG. 7.

FIGS. 7 and 8 illustrate a modification 36a to the illumination lens system 36 of FIGS. 2–3. In lens system 36a, a fresnel or spherical lens 72 is positioned at its focal length from the divergence point of cylinder lens 62, and at its focal distance away from incidence on container sidewall 38. Fresnel or spherical lens 72 thus functions both to collimate and converge the light energy from cylinder lens 62, so that the light energy is directed as a line-shaped beam onto the surface of container sidewall 38 as previously described.

Figure 9:
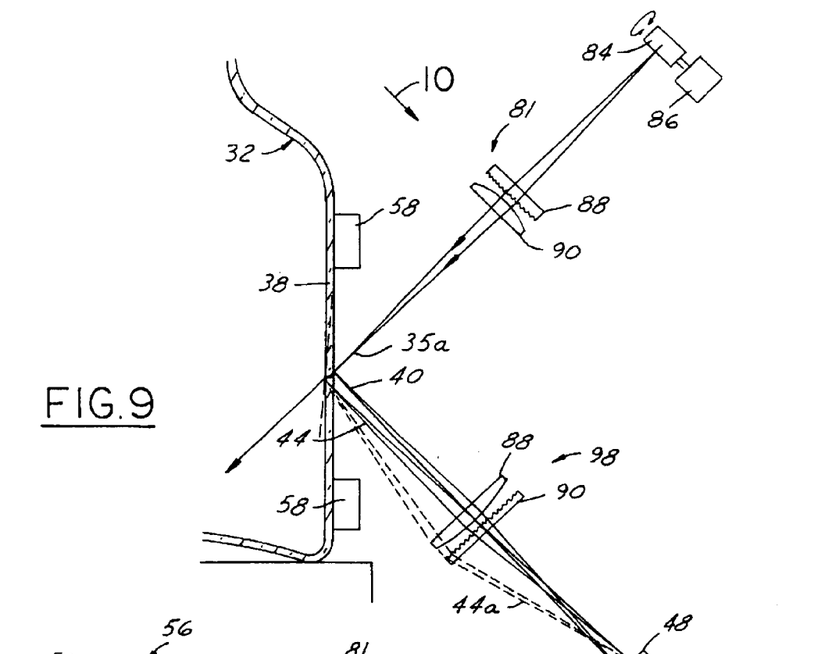
FIG. 9 is a schematic diagram of a sidewall thickness measurement apparatus, which is similar to FIG. 2 but shows a modified embodiment of the invention.
Figure 10:
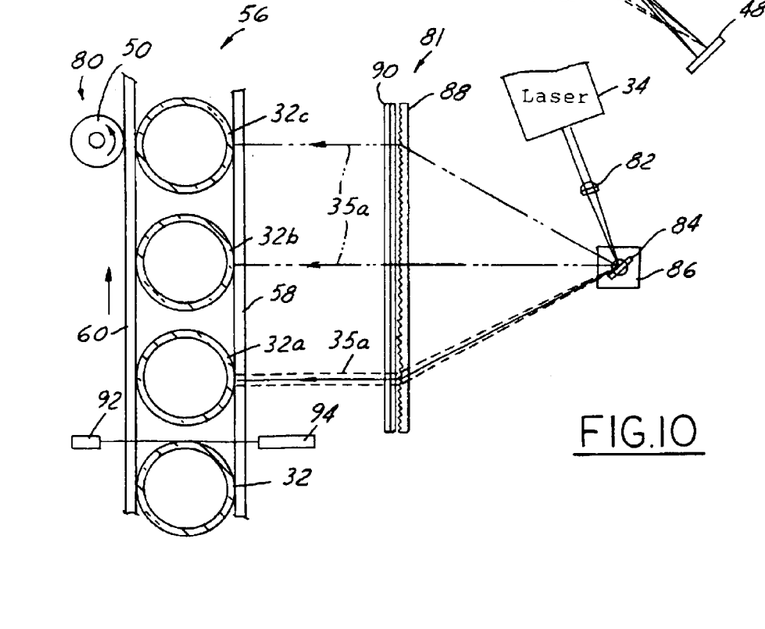
FIG. 10 is a top plan view of the illumination system in the embodiment of FIG. 9, being taken in the direction 10 in FIG. 9.

In the embodiments of the invention thus far described, only a single container 32 can be translated through the field of the illumination and imaging systems at one time. FIGS. 9–10 illustrate an apparatus 80 in accordance with a modified embodiment of the invention for translating multiple containers 32a, 32b, 32c between belt 60 and rails 58 through the fields of view of the illumination and imaging systems. The output of laser 34 is directed in an illumination lens system 81 through a positive spherical lens 82 to converge the light to a point at the axis of rotation of a mirror 84 coupled to a galvanometer motor 86. From mirror 84, the light energy is directed through a fresnel lens 88 and a cylinder lens 90 to focus at the plane of rails 58, and thus at the outside surface of sidewalls 38 of containers 32 in engagement with the rails. Thus, instead of directing one broad illumination beam simultaneously across the entire inspection station, the illumination beam 35a is fairly narrow and incrementally directed across the inspection station by control of galvanometer 86 and mirror 84. Fresnel lens 88 is placed at its focal length away from the axis of mirror 84. The divergent beam from mirror 84 thus exits fresnel lens 88 as a collimated bundle, with all rays parallel to the axis of the illumination system and perpendicular to the axes of the containers. Cylinder lens 90 converges the moving collimated beam into a line-shaped light beam at the point of incidence with the container sidewall, as previously discussed. Thus, galvanometer 86 and mirror 84 are controlled by information processor 50 (FIG. 1) sequentially to direct the illuminating light energy onto information processor 50 (FIG. 1) sequentially to direct the illuminating light energy onto containers 32a, 32b, 32c within the inspection station. A light source 92 and a detector 94 are coupled to the information processor to synchronize the information processor to entry of containers into the inspection station. Encoder 50 is coupled to drive belt 60 for tracking translation of the containers through the inspection station. Thus, galvanometer 86 and mirror 84 are controlled by the information processor first to obtain a wall thickness measurement at container 32a, then at container 32b, and then at container 32c. The measurement beam is then redirected onto container 32a, which will have advanced and rotated in the inspection station and present a differing sidewall area for thickness inspection. This process is repeated continuously as containers enter and leave the inspection station, so that information processor 50 (FIG. 1) effectively samples sidewall thickness at increments around each container.

Figure 11:
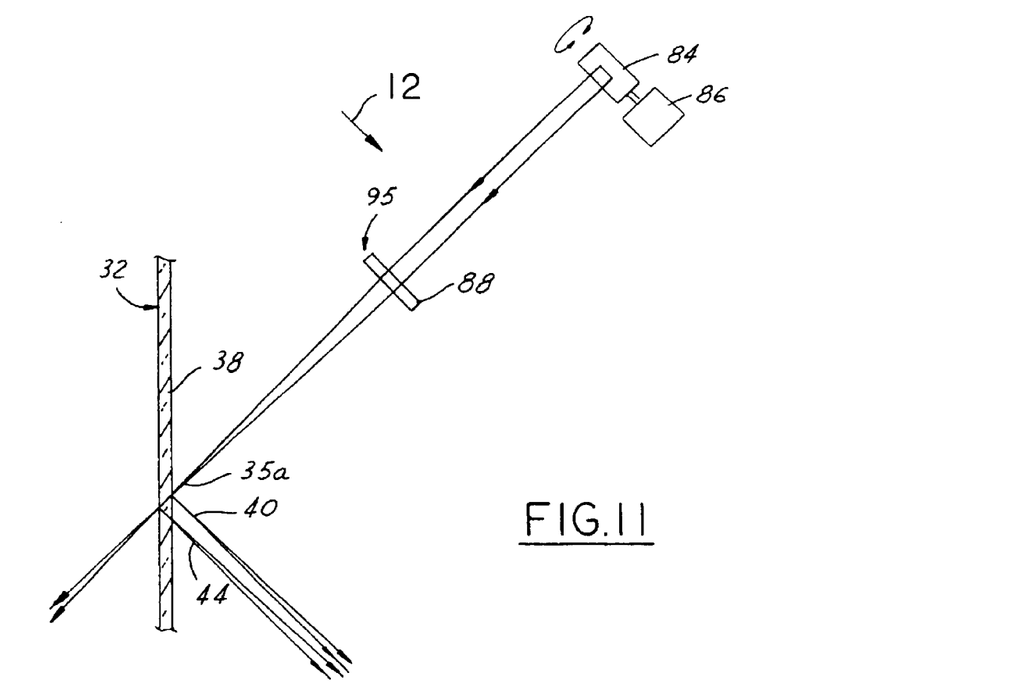
FIG. 11 is a fragmentary schematic diagram that illustrates a modification to the illumination system in FIG. 9.
Figure 12:
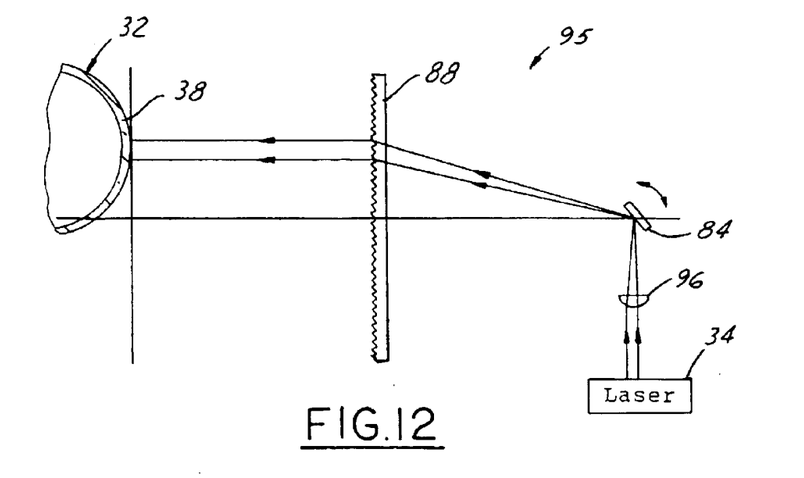
FIG. 12 is a top plan view of the illumination system of FIG. 11, being taken from the direction 12 in FIG. 11.

FIGS. 11 and 12 illustrate an illumination lens system 95, as a modification to illumination lens system 81 of FIGS. 9 and 10. Here a cylinder lens 96 is used to convert the laser output beam to a narrow line at the pivot axis of mirror 84. After reflection from the mirror, the beam diverges and strikes fresnel lens 88. The fresnel lens is placed at its focal distance from the axis of mirror 84 and the opposing surface of container 32. The collimated light entering the fresnel lens is converged to a narrow line-shaped light beam at the container. The mirror again sweeps the divergent beam across the fresnel lens, and the light exits the fresnel lens parallel to the axis of the system.

Figure 13:
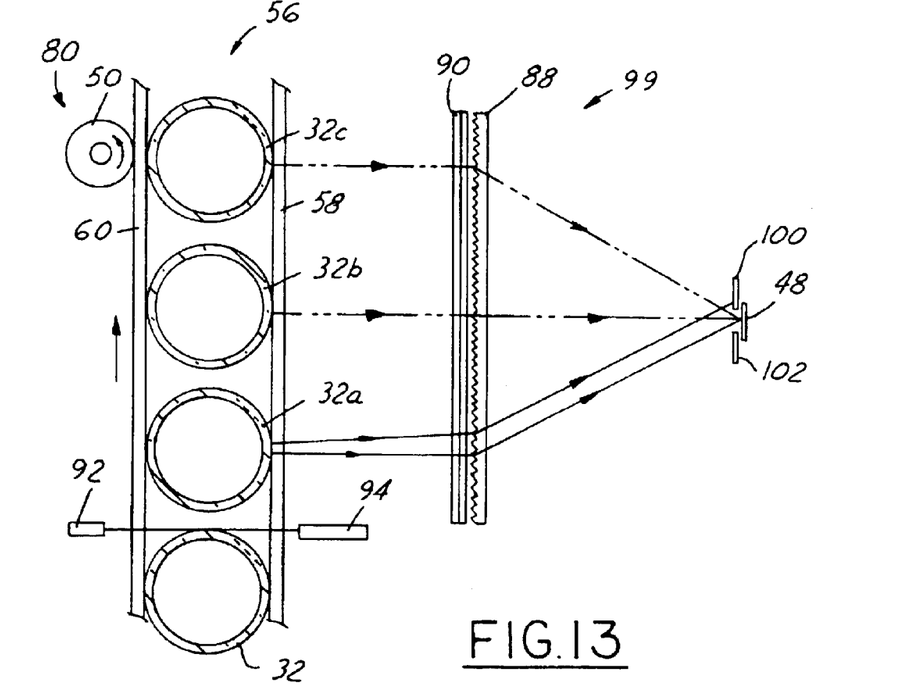
FIG. 13 is a top plan view of a modification to the imaging system in FIG. 9.

FIG. 13 illustrates a modification to the embodiment of FIGS. 9–10 in which the imaging lens system 99 includes a photocell 100, 102 positioned on each side of sensor 48. Thus, to the extent that any light energy is incident on either photocell 100 or 102, such light energy indicates a lack of synchronization of the galvanometer-driven mirror with containers traveling through the inspection station. Information processor 50 can make appropriate corrections to control of the mirror. As a modification to the embodiment of FIG. 13, photocells 100, 102 may comprise cells of an area array sensor disposed on opposing sides of the cell array of primary interest for making container thickness measurements.

There has thus been described a method and apparatus for measuring wall thickness of transparent cylindrical containers that fully satisfy all of the objects and aims previously set forth. The invention has been disclosed in conjunction with a number of presently preferred embodiments, and additional modifications and variations have been discussed. Other modifications and variations will readily suggest themselves to persons of ordinary skill in the art in view of the foregoing detailed description. The invention is intended to embrace all such modifications and variations as fall within the spirit and broad scope of the appended claims.

What is claimed is:

1. A method of measuring wall thickness of a transparent cylindrical container that comprises the steps of:
    (a) moving the container transversely of its axis along a defined path while simultaneously rotating the container about its axis,
    (b) directing onto a wall of the container, as it rotates and translates in said steps (a), a line-shaped light beam having a long dimension perpendicular to the axis of the container and parallel to the direction of translation of the container,
    (c) directing onto a light sensor light energy reflected from portions of outer and inner wall surfaces of the container that are perpendicular to light energy directed onto the container in said step (b), as viewed from a direction parallel to the container axis, and
    (d) measuring container wall thickness as a function of separation at said sensor between said light reflected from said outer and inner wall surfaces.

2. The method set forth in claim 1 wherein said step (a) is accomplished by rolling the container along a rail.

3. The method set forth in claim 2 wherein said rail is a linear rail.

4. The method set forth in claim 3 wherein said containers are moved horizontally in said step (a) with their axes oriented vertically, and wherein said steps (b) and (c) are carried out in a vertical plane that is perpendicular to the direction of translation of said container in said steps (a).

5. A method of measuring wall thickness of transparent cylindrical containers that comprises the steps of:
    (a) moving the containers transversely of its axis along a defined path and simultaneously rotating the containers about their central axes,
    (b) directing light energy onto each container traveling in said path, at an angle to the axis of the container such that a portion of the light energy is reflected from an outer surface of the container wall and a portion is refracted into the container wall and reflected from an inner wall surface,
    (c) directing into a light sensor portions of the light energy reflected from the outer and inner wall surfaces along a light paths coplanar with said axis, and (d) measuring wall thickness of each container as a function of separation at said sensor between said light portions reflected from the inner and outer wall surfaces of the container.

6. The method set forth in claim 5 wherein said step (c) comprises the steps of:

(c1) scanning said sensor at increments of container translation along said path, and (c2) measuring wall thickness at angularly spaced positions around said container wall corresponding to said increments of container translation along said path.

7. The method set forth in claim 6 wherein said step (b) comprises the step of directing said light energy continuously into each container as the container moves along said path.

8. The method set forth in claim 6 wherein said step (a) comprises moving and simultaneously rotating multiple containers along said path, and wherein said step (b) comprises the step of directing said light energy onto each of the containers in sequence as the containers are moved and rotated along said path.

9. Apparatus for measuring wall thickness of a container, which comprises:

a conveyor for moving the container transversely of its axis through an inspection station and simultaneously rotating the container about its axis, a light source and an illumination lens system for directing onto a wall of the container, as it passes through said inspection station, a line-shaped light beam having a long dimension perpendicular to the axis of the container and parallel to the direction of movement of the container through the inspection station, a light sensor and an imaging lens system for directing onto said sensor light energy reflected from portions of the outer and inner wall surfaces that are perpendicular to light energy directed onto the container as viewed from a direction parallel to the container axis, and an information processor responsive to light energy directed onto said light sensor by said imaging lens system for determining thickness of the container between said outer and inner wall surfaces.

10. The apparatus set forth in claim 9 wherein said illumination lens system directs said light beam continuously into each container as it moves through said inspection station.

11. The apparatus set forth in claim 9 wherein said conveyor is constructed to move multiple containers through said inspection station in sequence, and wherein said illumination lens system includes a mirror and an actuator coupled to said mirror to direct said beam onto each container in sequence as the container moves through said inspection station.

12. The apparatus set forth in claim 11 wherein said information processor is coupled to said actuator for selectively controlling direction of light energy onto the containers.

13. The apparatus set forth in claim 9 further comprising an encoder coupled to said conveyor, said information processor being coupled to said encoder for scanning said sensor at increments of container motion through said inspection station.

14. The apparatus set forth in claim 9 wherein said conveyor comprises a rail and a belt for rolling the container along said rail, said light source being disposed to direct light energy onto an external surface of the container adjacent to said rail.

15. The apparatus set forth in claim 9 wherein said imaging lens system includes a fresnel lens having a focal point at said sensor.

16. The apparatus set forth in claim 9 wherein said light source comprises a laser, and wherein said illumination lens system comprises a cylinder lens for fanning the output of said laser into a flat beam having a divergence point at said cylinder lens, and a secondary illumination lens having a first focus at said divergence point and a second focus at the outer surface of the container.

17. The apparatus set forth in claim 16 wherein said secondary lens includes a fresnel lens, a spherical lens, or a pair of cylinder lenses.

18. The apparatus set forth in claim 9 wherein said light source comprises a laser, and wherein said illumination lens system comprises a spherical lens for focusing the output of said laser, a fresnel lens having a focus at the focus of said spherical lens, and a cylinder lens having a focus at the outer surface of the container.

19. The apparatus set forth in claim 18 further comprising a mirror disposed at said focus of said spherical lens, and a motor coupled to said mirror for controlling direction of illumination light energy through said fresnel and cylinder lenses.

* * * * *